US010362036B2

(12) United States Patent
Yeom et al.

(10) Patent No.: US 10,362,036 B2
(45) Date of Patent: Jul. 23, 2019

(54) ELECTRONIC DEVICE, OPERATION METHOD THEREOF AND RECORDING MEDIUM

(71) Applicant: Samsung Electronics Co., Ltd., Gyeonggi-do (KR)

(72) Inventors: Dong-Hyun Yeom, Gyeonggi-do (KR); Geon-Soo Kim, Gyeonggi-do (KR); Yong-Joon Jeon, Gyeonggi-do (KR); Min-Kyung Hwang, Seoul (KR)

(73) Assignee: Samsung Electronics Co., ltd., Yeongtong-gu, Suwon-si, Gyeonggi-do (KR)

( * ) Notice: Subject to any disclaimer, the term of this patent is extended or adjusted under 35 U.S.C. 154(b) by 245 days.

(21) Appl. No.: 15/152,688

(22) Filed: May 12, 2016

(65) Prior Publication Data
US 2016/0344814 A1    Nov. 24, 2016

(30) Foreign Application Priority Data

May 21, 2015  (KR) .................. 10-2015-0071037

(51) Int. Cl.
*H04L 29/06* (2006.01)
*H04W 4/14* (2009.01)
*H04L 29/08* (2006.01)

(52) U.S. Cl.
CPC .......... *H04L 63/102* (2013.01); *H04L 63/104* (2013.01); *H04L 63/20* (2013.01);
(Continued)

(58) Field of Classification Search
CPC .................. H04L 41/22; H04L 61/2007; H04L 63/0884; H04L 63/102; H04L 67/06;
(Continued)

(56) References Cited

U.S. PATENT DOCUMENTS

2004/0143527 A1*  7/2004  Benkert ................ G06Q 20/04
                                                                    705/35
2004/0236818 A1   11/2004  Bantz et al.
(Continued)

FOREIGN PATENT DOCUMENTS

KR    10-2005-0019647 A    3/2005
KR    10-2006-0018820 A    3/2006
(Continued)

*Primary Examiner* — Amir Mehrmanesh
(74) *Attorney, Agent, or Firm* — Cha + Reiter, LLC

(57) ABSTRACT

An electronic device, a method thereof, and a recording medium are disclosed. A main electronic device according to various embodiments of the present disclosure includes: an input interface; a communication module electrically connected to the input interface; and a processor electrically connected to the input interface and the communication module. The input interface receives an authentication request for transmitting data to sub-electronic devices of a second device group by sub-electronic devices of a first device group. The main electronic device is included in the first device group, and the processor is configured to control transmission of the authentication request to a main electronic device of the second device group when the authentication request has been received by the communication module.

4 Claims, 22 Drawing Sheets

(52) U.S. Cl.
CPC ............... *H04W 4/14* (2013.01); *H04L 67/06* (2013.01); *H04L 67/141* (2013.01)

(58) Field of Classification Search
CPC ..... H04L 67/10; H04L 67/125; H04L 9/3226; H04L 9/3273; H04W 12/06; H04W 4/14
See application file for complete search history.

(56) References Cited

U.S. PATENT DOCUMENTS

| | | | |
|---|---|---|---|
| 2006/0211437 A1* | 9/2006 | Yang | H04W 4/08 455/518 |
| 2009/0295541 A1* | 12/2009 | Roof | G06F 19/3462 340/10.1 |
| 2010/0009708 A1* | 1/2010 | Horio | H04W 76/45 455/518 |
| 2014/0079054 A1 | 3/2014 | Guedalia et al. | |
| 2014/0173063 A1 | 6/2014 | Jeong et al. | |
| 2015/0127636 A1* | 5/2015 | Hofstetter | G06Q 10/10 707/722 |

FOREIGN PATENT DOCUMENTS

| | | |
|---|---|---|
| KR | 10-2008-0058322 A | 6/2008 |
| KR | 10-2012-0010899 A | 2/2012 |
| KR | 10-2013-0072984 A | 7/2013 |

\* cited by examiner

ELECTRONIC DEVICE, OPERATION METHOD THEREOF AND RECORDING MEDIUM

CLAIM OF PRIORITY

This application claims the benefit of priority under 35 U.S.C. § 119(a) from Korean Application Serial No. 10-2015-0071037, which was filed in the Korean Intellectual Property Office on May 21, 2015, the entire content of which is hereby incorporated by reference.

BACKGROUND

Field of the Disclosure

The present disclosure relates to an electronic device, a method of operating the electronic device, and a recording medium.

Description of the Related Art

Recently, in accordance with the wide spread prevalence of electronic devices, such as smart phones, as well as various electronic devices (for example, Samsung® Galaxy Gear™, etc.) which are operatively connected via the smart phone and via wired and wireless communications, the era of one device per person has ended, and the era of multiple devices per person has begun. According to the prevalence of the various electronic devices, functions or operations, by which the various electronic devices are connected to each other through the wired and wireless communication to be used as one electronic device, are being provided. Therefore, a user of the electronic device may transmit and receive target data among various electronic devices, which are registered (e.g., connected) with each other through a specific application (e.g., Samsung® Link™), of the user.

However, according to the prior art, even when electronic devices of a second user (i.e., a user of a reception side) are registered, for example, through a specific application, if a first user does not know certain transmission information (e.g., an IP address or an MAC address of at least one electronic device of the second user) required to allow a first user (i.e., a user of a transmission side) to transmit the target data to at least one electronic device (i.e., a reception target electronic device), the target data cannot be transmitted to the reception target electronic device. In other words, conventionally, a method of transmitting data is applied between only electronic devices included in the same group (e.g., a first device group described below), and there is great difficulty in attempting to transmit between different groups (e.g., a second device group described below). Therefore, the conventional method of transmitting data has shortcomings, and there is a need in the art to permit the application of transmitting data between various groups of electronic devices.

SUMMARY

The present disclosure addresses at least some of the shortcomings described above regarding transmissions between different groups and provides at least some of the advantages discussed herein below.

In the present disclosure, an electronic device is disclosed which can transmit and receive the target data between sub-electronic devices included in each of a plurality of device groups. The present disclosure permits authentication for transmitting target data between main electronic devices of different device groups (e.g., the first device group and the second device group) to be performed, even though the first user does not know the transmission information regarding the second device group.

In the present disclosure, a method of operating an electronic device permits transmitting and receiving the target data between sub-electronic devices included in each device group, even though the first user does not know the transmission information when the authentication for transmitting the target data between main electronic devices of device groups (e.g., the first device group and the second device group) is performed. The technical objectives disclosed in the present disclosure are not limited to the aforementioned technical objectives, and unmentioned or other technical objectives will be clearly appreciated by those skilled in the art from the following description.

In accordance with an aspect of the present disclosure, a main electronic device is provided. The main electronic device includes: an input device; a communication module electrically connected to the input device; and at least one processor electrically connected to the input device and the communication module, wherein the input device recieves an authentication request for transmitting data to sub-electronic devices of a second device group by sub-electronic devices of a first device group, the main electronic device is included in the first device group, and the at least one processor controls transmission of the authentication request to a main electronic device of the second device group when the authentication request has been received by the communication module.

In accordance with another aspect of the present disclosure, a plurality of sub-electronic devices are provided. The sub-electronic devices include: a display; a communication module electrically connected to the display; and at least one processor electrically connected to the display and the communication module, wherein the at least one processor controls the display to output a display list of one or more electronic devices which can transmit target data, on the basis of connection information received by a main electronic device connected to sub-electronic devices through a network, wherein the main electronic device and the sub-electronic devices are included in a first device group. In addition, when a selection input for at least one electronic device to which the target data is to be transmitted has been received, the at least one processor controls the communication module to configure a session for data communication with the selected electronic device on the basis of the connection information.

In accordance with another aspect of the present disclosure, there is provided a method of operating a main electronic device. The method includes: receiving an authentication request for transmitting target data to sub-electronic devices of a second device group by sub-electronic devices of a first device group, wherein the main electronic device is included in the first device group; and transmitting the authentication request to a main electronic device of the second device group when the authentication request has been input.

In accordance with another aspect of the present disclosure, there is provided a method of operating sub-electronic devices. The method includes: providing a list of one or more electronic devices which can transmit target data, on the basis of connection information received by a main electronic device connected to sub-electronic devices through a network, wherein the main electronic device and the sub-electronic devices are included in a first device group; and when a selection input for at least one electronic device to which the target data is to be transmitted has been received, configuring a session for data communication with the selected electronic device on the basis of the connection information.

According to various embodiments of the present disclosure, when authentication for target data transmission between respective main electronic devices in device groups (e.g., the first device group and the second device group) is performed, even though a first user does not know transmission information such as an IP address or an MAC address, target data can be transmitted and received between sub-electronic devices included in each of the device groups.

It will become apparent to those skilled in the art that the advantages of the present disclosure are not limited to those mentioned above, and the present disclosure includes various implicit advantages.

BRIEF DESCRIPTION OF THE DRAWINGS

The above and other aspects, features, and advantages of the present disclosure will be better-understood from the following detailed description taken in conjunction with the accompanying drawings, in which.

DETAILED DESCRIPTION

Figure 1:
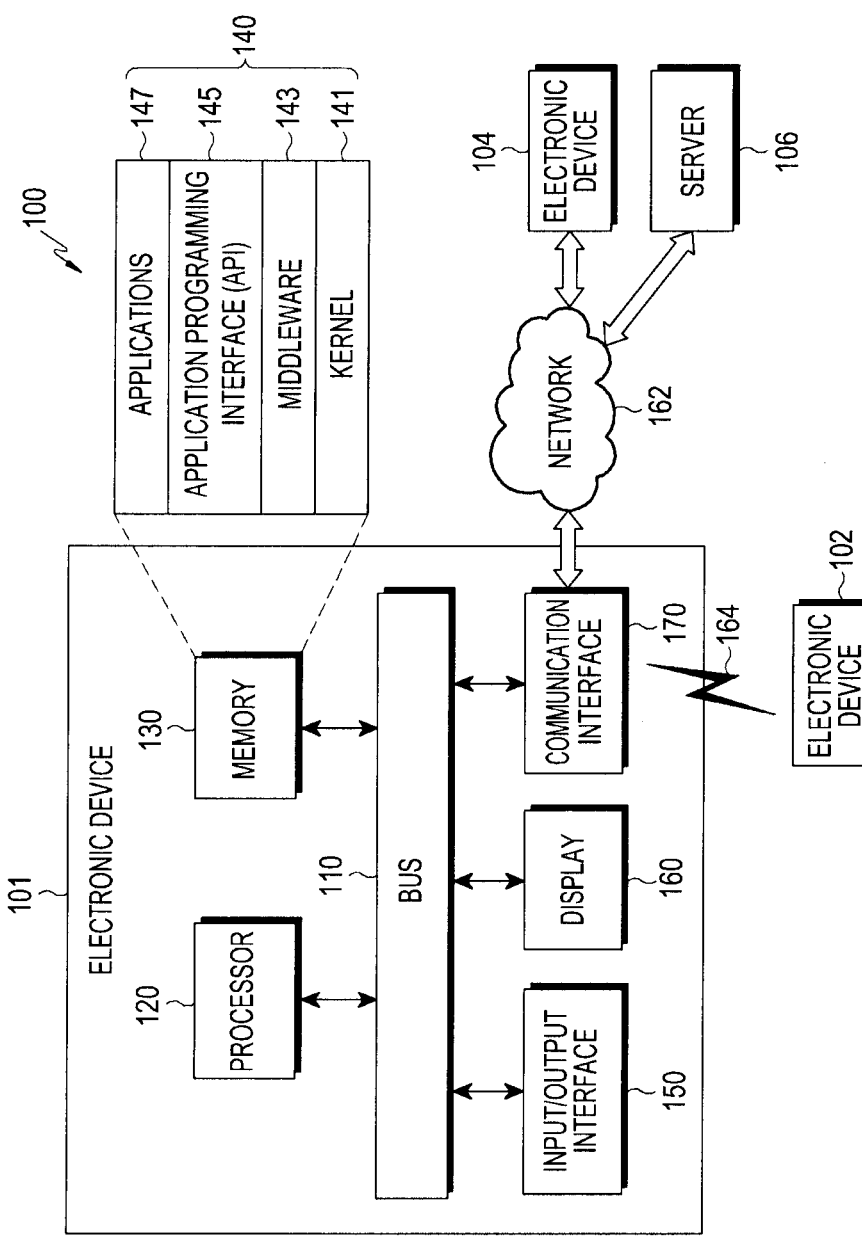
FIG. 1 illustrates an electronic device in a network environment according to various embodiments of the present disclosure.

Hereinafter, various embodiments of the present disclosure will be described with reference to the accompanying drawings. However, it should be understood that the present disclosure and the appended claims are not limited to the particular forms disclosed herein; rather, the appended claims are to be construed to cover various modifications, equivalents, and/or alternatives of embodiments of the present disclosure. In the description of the drawings, similar reference numerals may be used to designate similar elements.

As used herein, the expression "have", "may have", "include", or "may include" refers to the existence of a corresponding feature (e.g., numeral, function, operation, or constituent element such as a component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices and it is an incorrect interpretation of Applicant's disclosure to conclude that the first device and the second device can be the same device. However, with regard to the order. for example, a first element may be described as a second element, and similarly, a second element may be described as a first element without departing from the scope of the appended claims.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "designed to", "adapted to", "made to", according to the situation. The term "configured to" may not necessarily imply "specifically designed to" in hardware. Alternatively, in some situations, the expression "device configured to" may mean that the device, together with other devices or devices, "can perform". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) having integerated circuitry that performs the corresponding operations by executing one or more software programs stored in a non-transitory memory device.

The terms used herein are provided for the purpose of describing particular embodiments and are not intended to limit the scope of other embodiments or the appended claims. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude certain embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments of the present disclosure, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device by being contructed in part utilizing a flexible material. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g. an artificial intelligence electronic device) using an electronic device.

An electronic device 100 within a network environment 100, according to various embodiments, will be described with reference to FIG. 1. The electronic device 101 may include a bus 110, at least one processor 120, a non-transitory memory 130, an input/output interface 150, a display 160, and a communication circuit 170. In some embodiments, the electronic device 101 may omit at least one of the above elements or may further include other elements than shown and described.

The bus 110 may include, for example, a circuit for connecting the elements 110 to 170 and transferring communication (for example, control messages and/or data) between the elements.

The at least one processor 120 includes circuitry configured for operation, and may include one or more of a Central Processing Unit (CPU), an Application Processor (AP), and a Communication Processor (CP). For example, the at least processor 120 may perform operations or data processing relating to the control and/or communication of at least one other element of the electronic device 101.

The non-transitory memory 130 may include a volatile memory and/or a non-volatile memory. The non-transitory memory 130 may store, for example, instructions or data related to at least one other element of the electronic device 101. According to an embodiment, the non-transitory memory 130 may store software and/or a program 140 thereon. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

For example, the kernel 141 may control or manage system resources (for example, the bus 110, the at least processor 120, and the non-transitory memory 130) which are used to execute an operation or a function implemented in the other programs (for example, the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the at least one processor 120, the non-transitory memory 130, or the like) of the electronic device 101, to at least one of the application programs 147. For example, the middleware 143 may perform scheduling or load balancing on the one or more task requests by processing the one or more task requests according to the priorities assigned thereto.

The API 145 refers to an interface for controlling a function provided from the kernel 141 or the middleware 143, by the application program 147, and may include at least one interface such as a file control, a window control, an image process, or a character control, or a function (e.g., instructions).

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display, just to name some non-limiting possibilities. The display 160 may display, for example, various types of contents (e.g., text, images, videos, icons, or symbols) for the user. The display 160 may include a touch screen and receive, for example, a touch, a gesture, a proximity, or a hovering input by using an electronic pen or the user's body part.

The communication interface 170 may set communication between, for example, the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device (104) or the server (106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou") or Galileo, and a European Global Satellite-based Navigation System, according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102, 104, may be a device which is the same as or different from the electronic device 101. According to an embodiment, the server 106 may include a group of one or more servers. According to various embodiments of the present disclosure, all or some of the operations performed in the electronic device 101 may be performed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
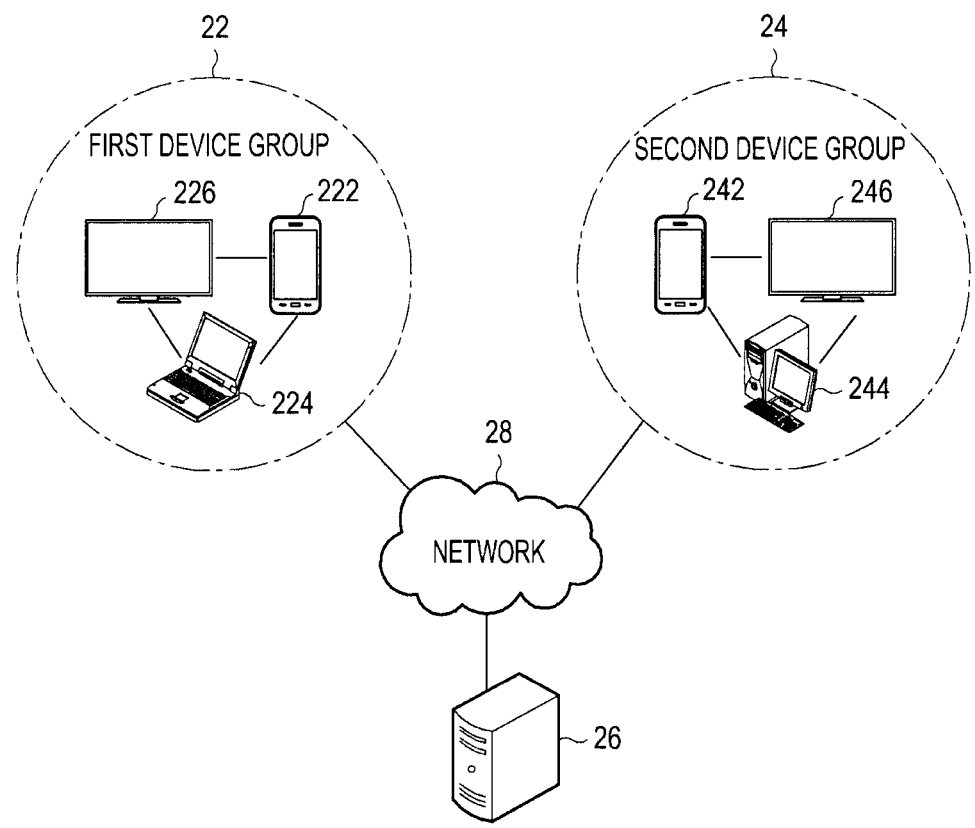
FIG. 2 illustrates an example of a cloud environment according to various embodiments of the present disclosure.

FIG. 2 illustrates an example of a cloud system according to various embodiments of the present disclosure.

Referring to FIG. 2, a cloud system 20 according to various embodiments of the present disclosure may include a first device group 22, a second device group 24, a cloud server 26, and a network 28 connecting the first device group 22, the second device group 24, and the cloud server 26.

The first device group 22 may include at least one main electronic device (e.g., a smart phone 222) and/or at least one sub-electronic device (e.g., a laptop 224, and a smart TV 226). A term "main electronic device" referred to in the present disclosure may refer to an electronic device performing an authentication function or operation for data transmission and reception between the groups (e.g., the first device group 22 and the second device group 24). For example, when the authentication request is performed by a call sending/receiving scheme, the main electronic device may be determined as an electronic device (e.g., the smart phones 222 and 242) in which the call sending/receiving is performed. Further, for example, when the authentication is performed through a Social Network Service (SNS), an electronic device (e.g., the laptop 224 and the smart phone 242) in which an authentication is performed through the SNS may be determined as the main electronic device. A term "sub-electronic device" referred to in the present disclosure may refer to an electronic device which is included in a device group identical to the main electronic device, and is connected (or can be connected) to the main electronic device through wired communication or wireless communication. A term "target data" referred to in the present disclosure may refer to data to be transmitted from the first device group to the second device group (or a third device group). According to various embodiments of the present disclosure, the "target data" may be stored in the main electronic device 222 or the sub-electronic devices 224 and 226 in the first device group 22. Further, according to various embodiments of the present disclosure, the "target data" may be stored in an external electronic device (e.g., the cloud server 26) other than the main electronic device 222 or the sub-electronic devices 224 and 226. Each of the device groups (e.g., the first device group 22 or the second device group 24) may be determined according to pre-determined items. The pre-determined items may include, for example, at least one among users of the main electronic device 222 and the sub-electronic devices 224 and 226, positions of the main electronic device 222 and the sub-electronic devices 224 and 226, and user identification information configured by the users (e.g. a user 35). According to various embodiments of the present disclosure, various electronic devices included in each of the groups 22 and 24 may be determined by a request of the user 35. The main electronic device 222 may receive a generation request of the device group (e.g., the first device group 22) from the user 35, and the main electronic device 22 or the cloud server 26 may generate the device group according to the request for the group generation. In addition, according to various embodiments of the present disclosure, the device group may be generated by a manufacturer server (not shown) of the main electronic device 22 or a provider server (not shown) of the application. Further, according to various embodiments of the present disclosure, the device group may be generated (i.e., determined) according to at least one among a contact frequency (e.g., the number of times of a sending call) with a user (e.g., the user 35) of the main electronic device 222 through the main electronic device 222, a relationship (e.g., family relations determined with reference to phone book data stored in the main electronic device 222) with the user, and a position (e.g., a common use printer located on a floor identical to a floor in which the main electronic device 222 is located) where the main electronic device is located. When the device group is generated on the basis of the position where the main electronic device 222 is located, at least one electronic device (e.g., the sub-electronic devices 224 and 226) included in the device group may be an electronic device in which a pre-determined authentication (e.g., a device authentication or a user authentication) is performed with the main electronic device 222.

The second device group 24 may be a device group generated by the first user 35 and another second user (e.g., a second user 37). Further, according to various embodiments of the present disclosure, the second device group may be generated by a user identical to the first user 35 and may be generated according to other items which are different from the items of the first device group 22 among the pre-determined items. The second device group 24 may include at least one main electronic device (e.g., a smart phone 242) and/or at least one sub-electronic device (e.g., a desktop 244, and a smart TV 246). According to various embodiments of the present disclosure, the various electronic devices 242, 244, and 246 included in the second device group 24 may receive the target data transmitted from the various electronic devices 222, 224, and 226 of the first device group 22. In addition, a description related to the first device group 22 may be identically applied to the second device group 24.

The cloud server 26 may refer to a server operated on the basis of the cloud server. The cloud server 26 may be connected to the various electronic devices included in the first device group 22 and the second device group 24, through the network 28. The cloud server 26 may store connection information (i.e., access information) of the various electronic devices included in each of the first device group 22 and the second device group 24. The connection information may include information required to allow at least one electronic device (e.g., the laptop 224) included in the first device group 22 to be connected to at least one electronic device (e.g., the desktop 244) included in the second device group 24. The connection information may include, for example, an IP address of the electronic device, a model number of the electronic device, a model name of the electronic device, as shown in table 1 below.

TABLE 1

| Connection information | Description |
| --- | --- |
| User ID | Account information of user having electronic device (e.g.,) koxbg92x6r |

TABLE 1-continued

| Connection information | Description |
| --- | --- |
| Electronic device ID | Serial number of electronic device stored in storage module of electronic device (e.g.,) 25783249 |
| Electronic device type | Type information of electronic device (e.g.,) PHONE, PC, TV, CAMERA.. |
| Electronic device model | Model information of electronic device (e.g.,) GT-I9100, SM-G900 |
| Electronic device name | Brand name of electronic device (e.g.,) Galaxy S5 |
| Physical address | Unique network identification information of electronic device (e.g.,) IMEI: 112429002702956, WIFI MAC address, BT MAC address, etc |
| Registration date | Date and time of registration of electronic device (e.g.,) 2014-05-19 09:58:29 |
| Phone number | Phone number registered in electronic device having telephone function (e.g.,) +821032032869 |

The table 1 is for describing examples of the connection information, and embodiments for the connection information is not limited by the table 1. The connection information may be received from various external electronic devices such as the main electronic device (e.g., the smart phones 222 and 242) or the manufacturer server of the main electronic device, and a communication agency server. The connection information may be transmitted to the cloud server 26 when the device group (e.g., the first device group 22) is generated. The connection information may be stored according to the pre-determined items (e.g., the user). When a new electronic device is added to the device groups 22 and 24, the cloud server 26 may receive connection information related to the newly added electronic device from the external electronic device. Further, when the electronic device (e.g., the smart TV 246) is removed from the device groups 22 and 24, the connection information stored in the cloud server 26 with regard to the removed electronic device may be deleted. However, according to various embodiments of the present disclosure, the cloud server 26 may be implemented by being omitted. In this event, the connection information may be stored in a storage module of the main electronic devices 222 and 242, and various functions and operations performed by the cloud server 26 may be performed by the main electronic devices 222 and 242.

The network 28 may include wired communication or wireless communication. The wireless communication may include at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM). Further, the wireless communication may include, for example, short-range communication. The short-range communication may include at least one of, for example, Wi-Fi, Bluetooth, ZigBee, Near Field Communication (NFC), millimeter wave (mmWave), and a Global Navigation Satellite System (GNSS). The example of the short-range communication such as Bluetooth is merely for describing the present disclosure, and the type of the short-range communication of the present disclosure is not limited thereto. According to various embodiments of the present disclosure, the short-range communication may include various short-range communication schemes such as various protocols for the Internet of Things (IoT) (i.e., protocols which are used in the IoT environment) and short-range communication protocols using a beamforming technology.

FIGS. 3A, 3B, 3C, 3D 3E and 3F illustrate an example of an authentication function or operation for transmitting and receiving a target data between main electronic devices according to various embodiments of the present disclosure.

Figure 3A:
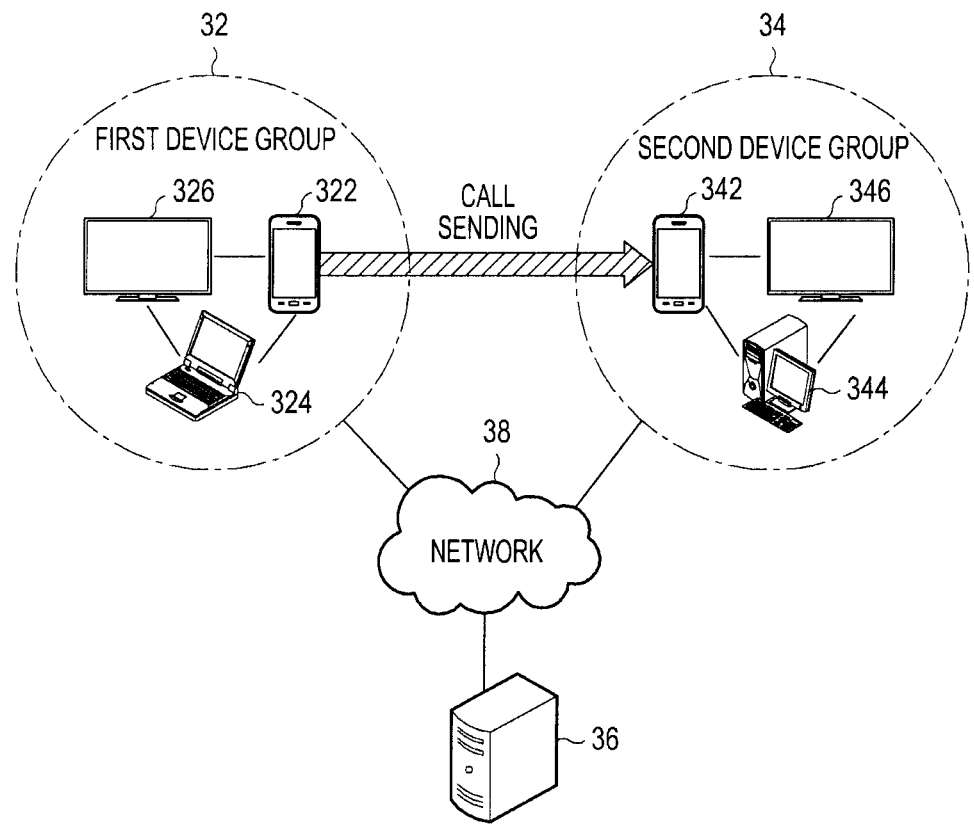
FIG. 3A, FIG. 3B, FIG. 3C, FIG. 3D, FIG. 3E and FIG. 3F illustrate an example of an authentication function or operation sequence for transmitting and receiving a target data between main electronic devices according to various embodiments of the present disclosure.
Figure 3B:

Referring now to FIGS. 3A and 3B, a main electronic device 322 of a first device group 32 and a main electronic device 342 of a second device group 34 include a call receiving/sending function, the authentication may be performed in a call sending/receiving scheme between the main electronic devices 322 and 342. The authentication through the call sending/receiving scheme corresponds to an example, and is not limited by the description like as the authentication scheme. In FIG. 3A, in order to perform an authentication for transmitting target data stored in the sub-electronic device 324 of the first device group 32 to the sub-electronic device 344 of the second device group 34, as shown in more detail in FIGS. 3B and 3C, the main electronic device 322 of the first device group 32 may send a call to the main electronic device 342 of the second device group 34.

Figure 3C:
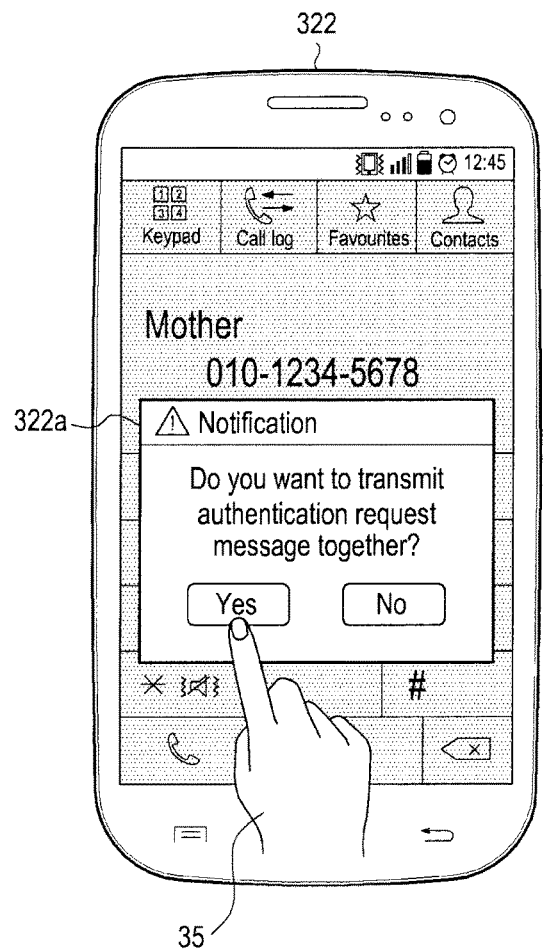

Referring now to FIG. 3C, in order to notify a user (i.e., the second user 37) of the main electronic device 342 of the second device group 34 that the call sending corresponds to a call sending for the authentication, the main electronic device 322 may receive a sending request of an authentication request message from a user (i.e., the first user 35) of the main electronic device 322 of the first device group 32. The sending request may be received through a guide message window 322a as shown in FIG. 3C.

Figure 3D:
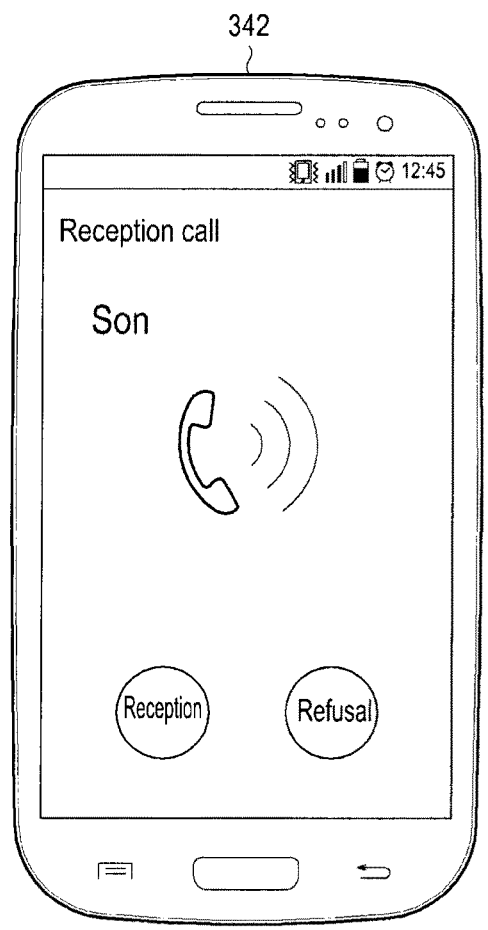
Figure 3E:
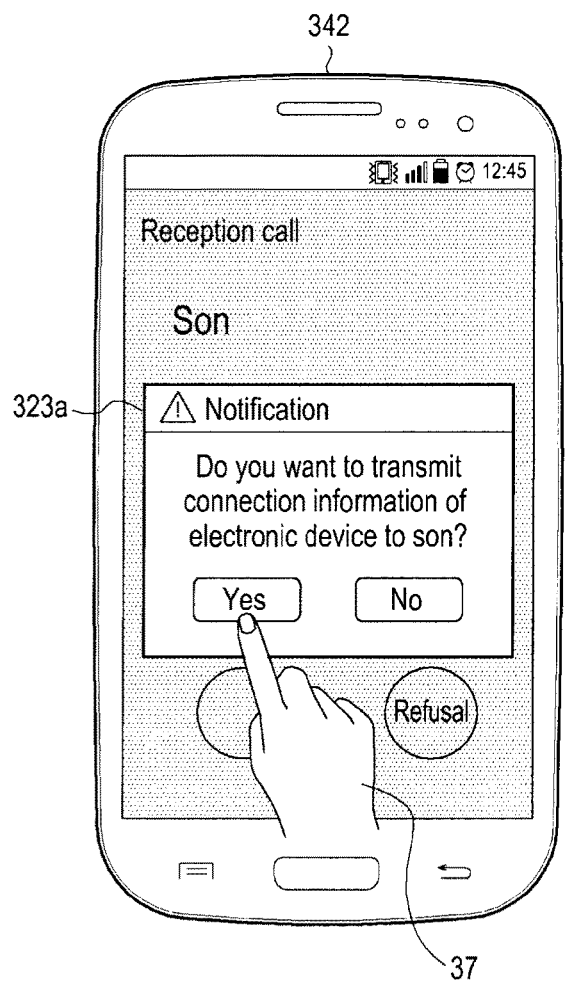

Referring now to FIGS. 3D and 3E, the main electronic device 342 may receive the authentication request message 323a. Through the authentication request message 323a, the main electronic device 342 may receive an input for whether the authentication is performed from the second user 37. According to various embodiments of the present disclosure, the authentication request message 323a may be transmitted to the main electronic device 342 even after a call connection with the second user 37 is performed (i.e., during a call). To this end, the main electronic device 322 may display a user interface receiving a sending request of the authentication request message 323a from the first user 35.

When the authentication is performed by the second user 37, a cloud server 36 may transmit connection information, which is stored in the cloud server 36, for various electronic devices 342, 344, and 346 of the second device group 34 to the main electronic device 322. The main electronic device 322 may share the received connection information with sub-electronic devices 324 and 326 included in the first device group 32.

According to various embodiments of the present disclosure, in an embodiment in which the cloud server 36 does not exist, the authentication is performed and then the connection information may be received from the main electronic device 322 of the second device group 34.

According to various embodiments of the present disclosure, the authentication request may be received by a plurality of main electronic devices.

Figure 3F:
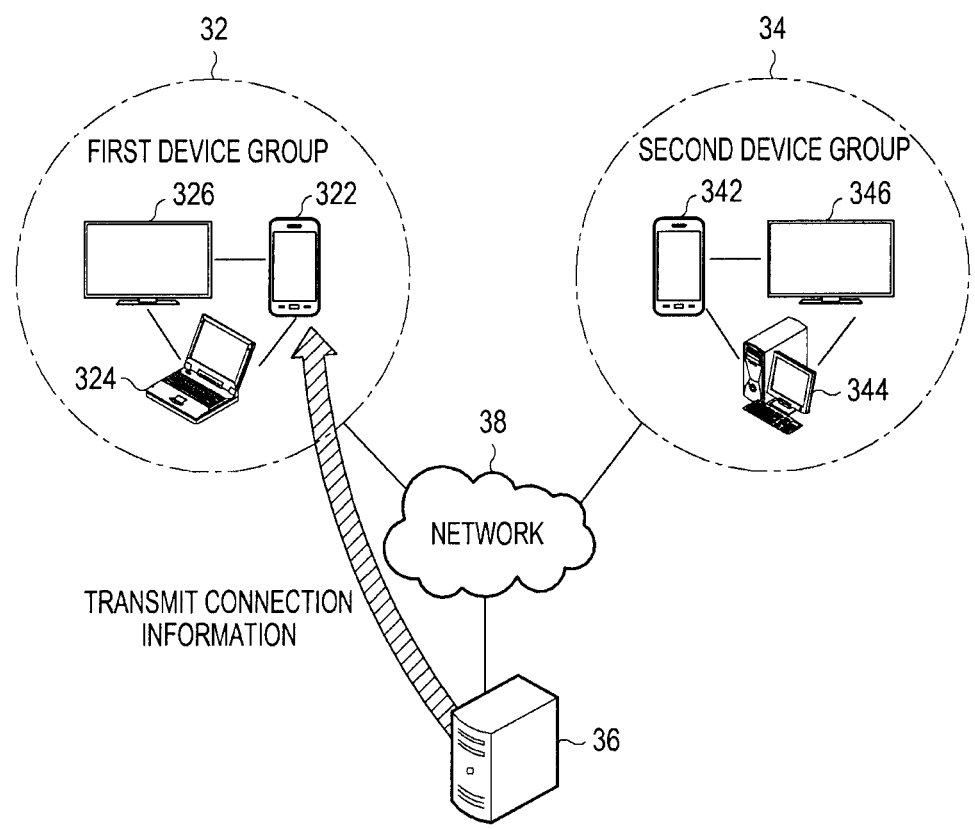
Figure 4A:
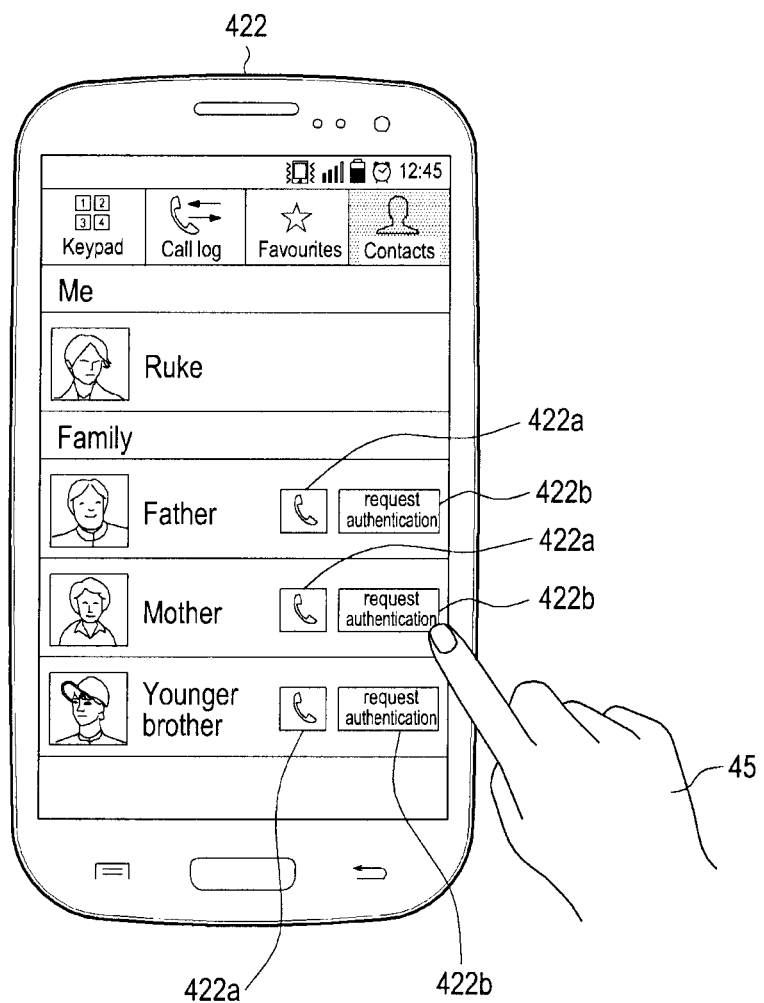
FIG. 4A, FIG. 4B and FIG. 4C illustrate an example of another embodiment in comparison with the authentication function or operation described with reference to FIGS. 3A, 3B, 3C, 3D, 3E and 3F.
Figure 4B:
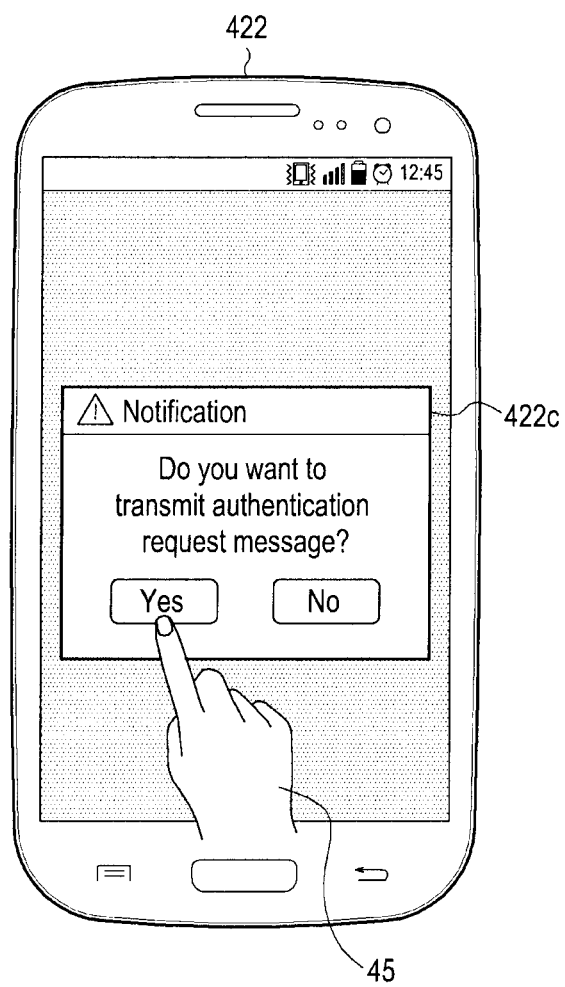
Figure 4C:
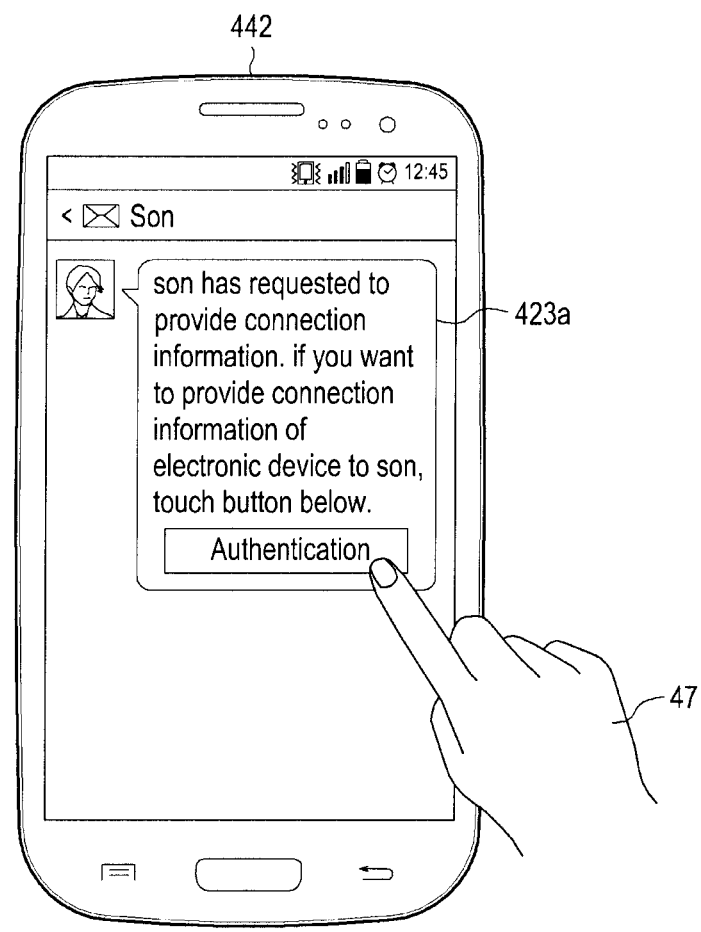

FIGS. 4A, 4B and 4C illustrate an example of another embodiment in comparison with the authentication function or operation described with reference to FIGS. 3A, 3B, 3C, 3D, 3E and 3F. FIGS. 4A, 4B, and 4C illustrate an embodiment in which an authentication is performed through an SMS transmission unlike the embodiment (i.e., a call sending scheme) related to the authentication scheme described with reference to FIGS. 3A to 3F.

Referring now to FIG. 4A, a main electronic device 422 of a first device group (e.g., the first device group 32) according to various embodiments of the present disclosure may display a user interface 422b for the authentication request in addition to a user interface 422a for call sending.

As shown in FIG. 4A, a first user 45 may select an authentication request user interface 422b for the authentication.

As shown in FIG. 4B, the main electronic device 422 may display a guide message 422c according to the request of the first user 45. When the authentication SMS transmission is requested from the first user 45 through the guide message 422c, the main electronic device 422 may transmit an authentication SMS for the main electronic device 442 of the second device group (e.g., the second device group 34). FIG. 4C illustrates an example in which the authentication SMS 423a is displayed in the main electronic device 442 of the second device group. The authentication SMS may include a user interface 423a which can receive authentication identification of a second user 47 as shown in FIG. 4C. When the authentication identification has been received from the second user 47, as shown in FIG. 3F, the main electronic device 422 may receive the connection information from a cloud server (e.g. the cloud server 36).

According to various embodiments of the present disclosure, the authentication scheme may include various schemes such as a scheme through an SNS (e.g., Chat On™) or an e-mail.

Figure 5A:
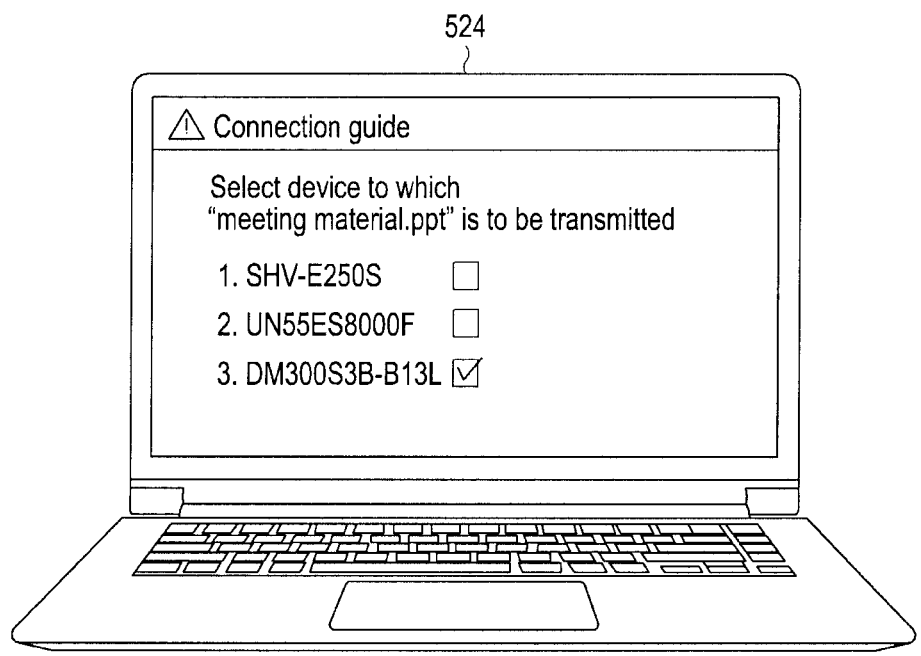
FIG. 5A illustrates an example of a function or an operation, which is configured by at least one electronic device, for transmitting target data after receiving connection information from a main electronic device.
Figure 5B:
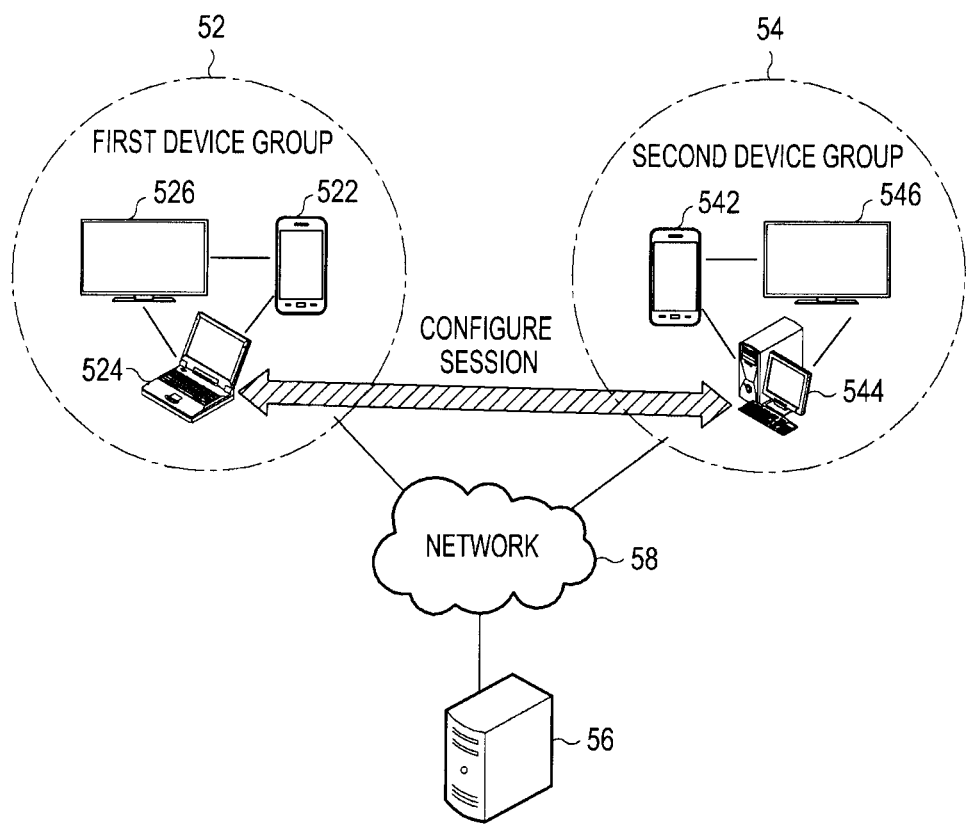
FIG. 5B illustrates an example for a function or an operation in which a session for transmitting target data is configured according to a selection as shown in FIG. 5A.

FIG. 5A illustrates an example of a function or an operation in which at least one electronic device for transmitting target data after receiving connection information by a main electronic device is configured. FIG. 5B illustrates an example for a function or an operation in which a session for transmitting target data is configured according to a selection as shown in FIG. 5A.

Referring now to FIG. 5A, the connection information has been received by a main electronic device 522 of a first device group 52, and then a first user (e.g., the first user 35) may receive a selection of at least one among various electronic devices 542, 544, and 546 included in a second device group 54 in order to transmit target data (e.g., "materials for meeting.ppt"). As shown in FIG. 5A, the selection for transmitting the target data may be input through an electronic device (e.g., the sub-electronic device 524) in which the target data is stored. According to various embodiments of the present disclosure, the selection for transmitting the target data may be input to the main electronic device 522 of the first device group 52. FIG. 5A illustrates an embodiment in which a list of electronic devices which can transmit the target data is displayed as model information of the electronic devices. When an input has been received as shown in FIG. 5A, the sub-electronic device 542 may configure a session for data communication between an electronic device (e.g., the sub-electronic device 544), to which the target data is to be transmitted, and the sub-electronic device 524 as shown in FIG. 5B. According to various embodiments of the present disclosure, a function or an operation for configuring the session may be performed by the main electronic device 522. The term "session" referred to in the present disclosure may be replaced with the term "channel".

According to various embodiments of the present disclosure, the target data is transmitted from the sub-electronic device 524 where the target data is stored to the main electronic device 522, and then the main electronic device 522 may transmit the target data to the selected sub-electronic device 544 or the main electronic device 542 of the second device group 54 on the basis of the connection information. In this event, the main electronic devices 522 and 542 may function as a type of router.

According to various embodiments of the present disclosure, a first device group 52 or the second device group 54 may be determined according to at least one among user identification information, positions of the main electronic device 522 or the sub-electronic devices 524 and 526, unique identification numbers of the main electronic device 522 or the sub-electronic devices 524 and 526, and IP addresses of the main electronic device 522 or the sub-electronic devices 524 and 526.

According to various embodiments of the present disclosure, the authentication request may include call sending for the main electronic device 542 of the second device group 54 or transmission of the authentication SMS.

According to various embodiments of the present disclosure, the main electronic devices 522 and 542 and the sub-electronic devices 524, 526, 544, and 546 can be connected each other through wireless communication in each of the device groups 52 and 54.

According to various embodiments of the present disclosure, the connection information may be received from the cloud server 56 connected to the main electronic device 522 of the first device group 52 through wireless communication.

Alternatively, according to various embodiments of the present disclosure, the connection information may be received from the main electronic device 542 of the second device group 54.

According to various embodiments of the present disclosure, the connection information may be transmitted to the main electronic device 522 of the first device group 52 according to a pre-determined authority level. For example, in a company intranet network environment, according to a position of a user who uses the main electronic device 522 or the sub-electronic devices 524 and 526, access authority for the main electronic device 542 or the sub-electronic devices 544 and 546 of the second device group 54 may be limited or extended.

According to various embodiments of the present disclosure, the data communication may include a file transmission and reception between the sub-electronic devices (e.g., the sub-electronic device 524 and the sub-electronic device 544) connected through the configured session, or sharing of a screen which is being displayed in each of the sub-electronic devices connected through the configured session.

According to various embodiments of the present disclosure, network environments between the first device group 52 and the second device group 54 may be different from each other. For example, the second device group 54 may include electronic devices operated on the basis of an intranet network, and the first device group 52 may include electronic devices operated on the basis of a network outside of the intranet. In this event, when authentication by the call sending/receiving is performed, the main electronic device 542 of the second device group 54 may transmit connection information of electronic devices included in the second device group 54 and information on the main electronic device 522 of the first device group 52, through a system management server which manages the intranet through Mobile Device Management (MDM). The system management server may configure a session for data communication between one or more sub-electronic devices belonging to each of the device groups 52 and 54 by transmitting the received connection information to the main electronic device 522 of the first device group 52.

According to various embodiments of the present disclosure, when a pre-determined e-mail address is included in the received connection information, the main electronic device 522 may transmit the target data to the pre-determined e-mail address.

According to various embodiments of the present disclosure, the sub-electronic device (e.g., the smart TV 546) may be a common electronic device (e.g., a conference room TV). As described above, even when the sub-electronic devices correspond to electronic devices belonging to only a specific user as well as common electronic devices included in a plurality of device groups for a plurality of users, the description for the various embodiments of the present disclosure may be identically applied.

Figure 6A:
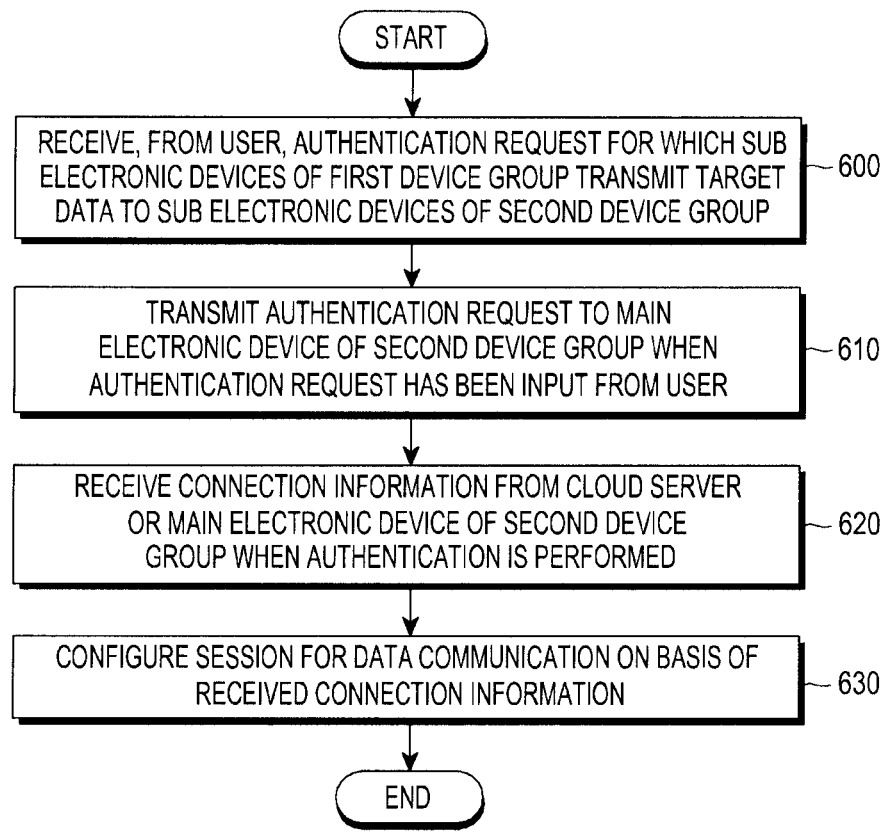
FIG. 6A is a flowchart illustrating an operational example of a main electronic device according to various embodiments of the present disclosure.

FIG. 6A is a flowchart illustrating an operational example of a method of main electronic device according to various embodiments of the present disclosure.

Referring now to FIG. 6A, a method of operating a main electronic device (e.g., the main electronic device 322) at operation 600 of inputting (i.e., receiving), from a user, an authentication request for which sub-electronic devices (e.g., the sub-electronic devices 324 and 326) of a first device group (e.g., the first device group 32) transmit target data to sub-electronic devices (e.g., the sub-electronic 344 and 346) of a second device group (e.g., the second device group 34).

At operation 610, there is a transmitting of the authentication request to the main electronic device 342 of the second device group 34 when the authentication request has been input from a user (e.g., the first user 35).

At operation 620, with regard to main electronic device 322, the connection information is received from a cloud server (e.g., the cloud server 36) and the main electronic device 342 when the authentication is performed.

At operation 630, with regard to the main electronic device 322, configuring a session for data communication is performed on the basis of the received connection information. However, operation 630 may be performed by a sub-electronic device (e.g., the laptop 324) in which the target data has been stored.

Figure 6B:
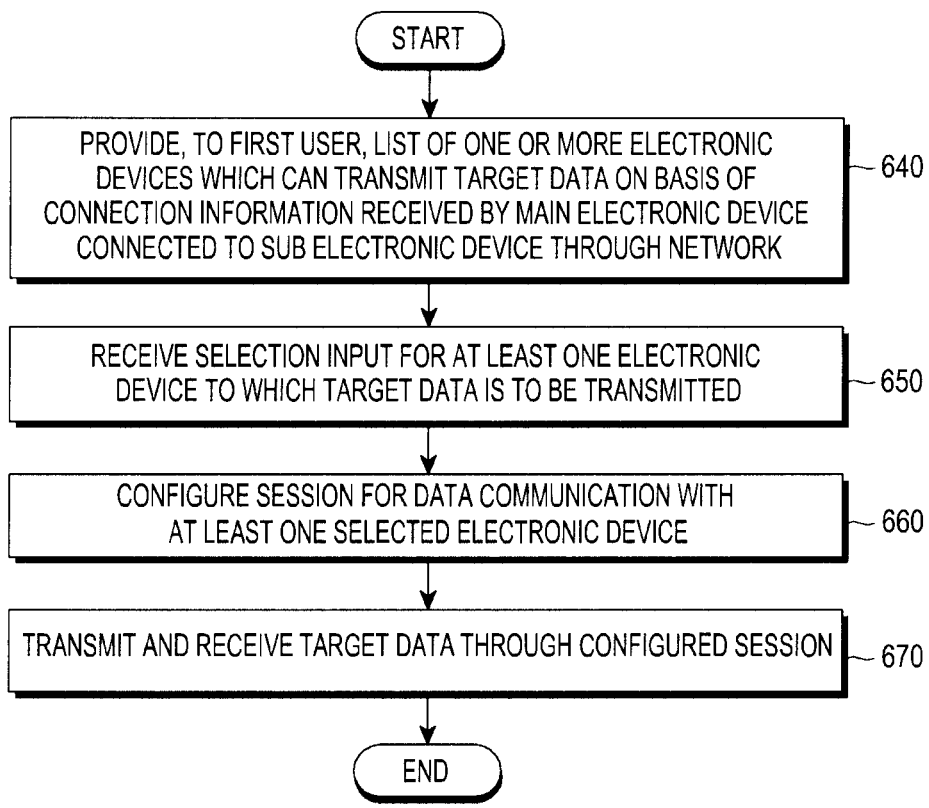
FIG. 6B is a flowchart illustrating an example of a method of operating a sub-electronic device according to various embodiments of the present disclosure.

FIG. 6B is a flowchart illustrating an operational example of a method for operating a sub-electronic device (e.g., the sub-electronic device 324) according to various embodiments of the present disclosure.

At operation 640, a sub-electronic device 324 according to various embodiments of the present disclosure may include providing, to the first user 35, a list of one or more electronic devices which can transmit the target data on the basis of connection information received by the main electronic device 322 connected to the sub-electronic device 324 through a network 38. The list of the electronic devices may include various electronic devices 342, 344, and 346 included in the second device group 34.

At operation 650, the sub-electronic device 324 according to various embodiments of the present disclosure includes receiving a selection input for at least one electronic device to which the target data is to be transmitted.

At operation 660, the sub-electronic device 324 configures a session for data communication with at least one electronic device selected according to an input in operation 650 on the basis of the input and the received connection information in operation 650. Operation 660 may be performed by the main electronic device 322.

At operation 670, sub-electronic device 324 includes transmitting and receiving the target data through the configured session.

In addition, the description for the main electronic device or the sub-electronic devices according to various embodiments of the present disclosure described with reference to FIGS. 2 to 5B may be identically applied to FIGS. 6A and 6B.

FIGS. 7A, 7B, 7C, 7D, 7E, 7F, and 7G illustrate examples for describing a function or an operation of displaying information of one or more sub-electronic devices, as a result of searching for devices by a main electronic device of a first device group according to various embodiments of the present disclosure. For the description of FIGS. 7A through 8, an electronic device 722 of a first device group 72 searching for a short-range is referred to as a main electronic device, and electronic devices (e.g., an electronic device 742, an electronic device 762, and an electronic device 77, and an electronic device 78) having a phone number are referred to as main electronic devices.

Figure 7A:
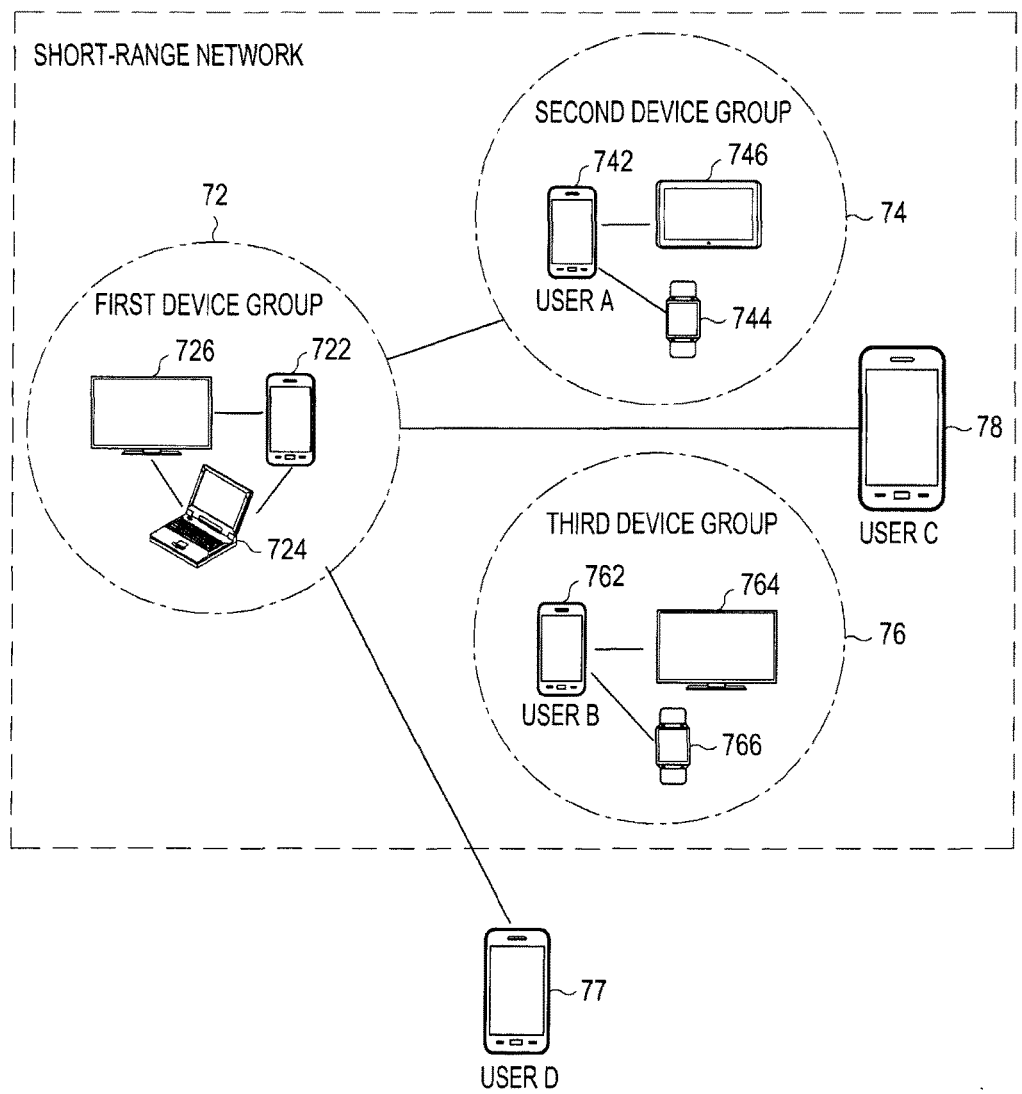
FIG. 7A, FIG. 7B, FIG. 7C, FIG. 7D, FIG. 7E, FIG. 7F and FIG. 7G illustrate examples for describing a function or an operation of displaying information of one or more sub-electronic devices, as a result of searching for devices by a main electronic device of a first device group according to various embodiments of the present disclosure.

Referring now to FIG. 7A, the main electronic device 722 of the first device group 72 may perform a short-range search through a communication module (e.g., the communication interface 170). In FIG. 7A, according to a result of the short-range search, electronic devices located in a short-range network are shown as, for example, a second device group 74, a third device group 76, and a portable terminal 78. Phone numbers of the main electronic device 742 of the second device group 74 and a main electronic device 762 of the third device group 76 may be stored in the main electronic device 722 of the first device group 72. However, a phone number of the electronic device 78 of a user C may not be stored in the main electronic device 722. A phone number of an electronic device 77 of a user D has been stored in the main electronic device 722, but the electronic device 77 of the user D may correspond to an electronic device which is not located on a short-range network as a result of the short-range search. The electronic devices 742, 744, and 746 of a user A and the electronic devices 762, 764, and 766 of a user C may be located on the short-range network with the electronic device 722. Connection information of sub-electronic devices 744, 746, 764, and 766 included in the device groups 74 and 76 may be stored in the main electronic devices 742 and 762. Further, when a short-range search by the main electronic device 722 has been detected, the main electronic devices 742 and 762 may previously configure connection information stored in the main electronic devices 742 and 762 to be provided to the main electronic device 722 of the first device group 72. To this end, device information of the main electronic device 722 may have been stored in the main electronic devices 742 and 762. Therefore, the main electronic device 722 may obtain connection information of the sub-electronic devices 744, 746, 764, and 766 through the short-range search.

Figure 7B:

After the short-range search has been completed, as shown in FIG. 7B, a first user 75 may receive a display request for phone book data stored in the electronic device 722.

Figure 7C:
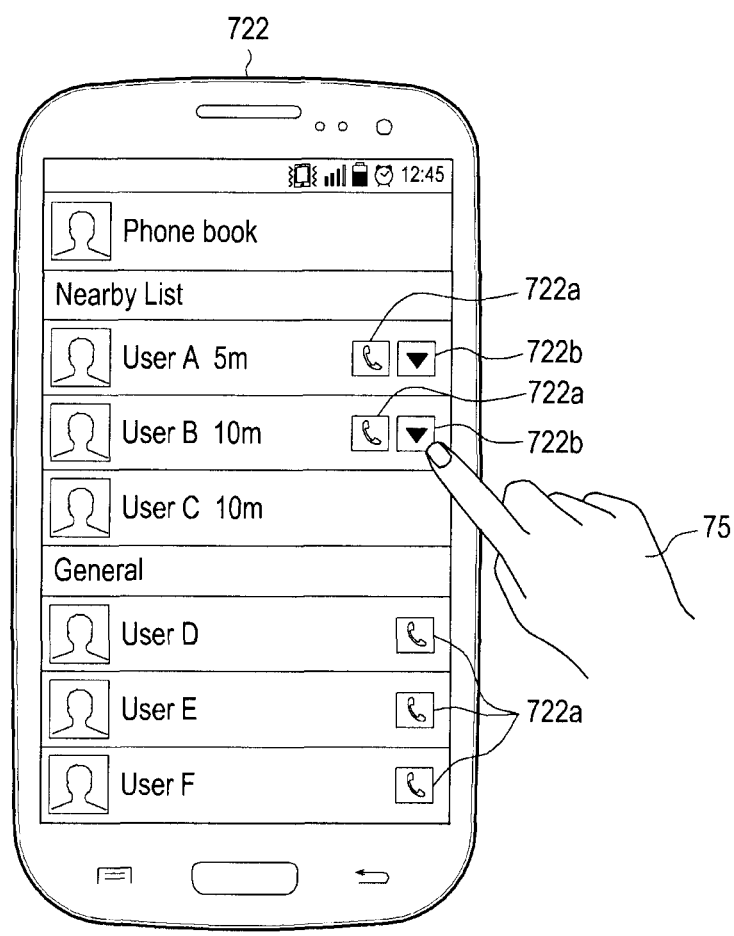

Referring now to FIG. 7C, on the basis of connection information obtained through the result of the short-range search and the phone book data, the main electronic device 722 may display a user interface 722b for providing connection information of the sub-electronic devices 744, 746, 764, and 766 obtained through the short-range search other than a user interface 722a for call sending. The connection information of the sub-electronic devices 744, 746, 764, and 766 may be provided to a user (e.g., a first user 75) by being classified according to phone numbers of the sub-electronic devices.

Figure 7D:
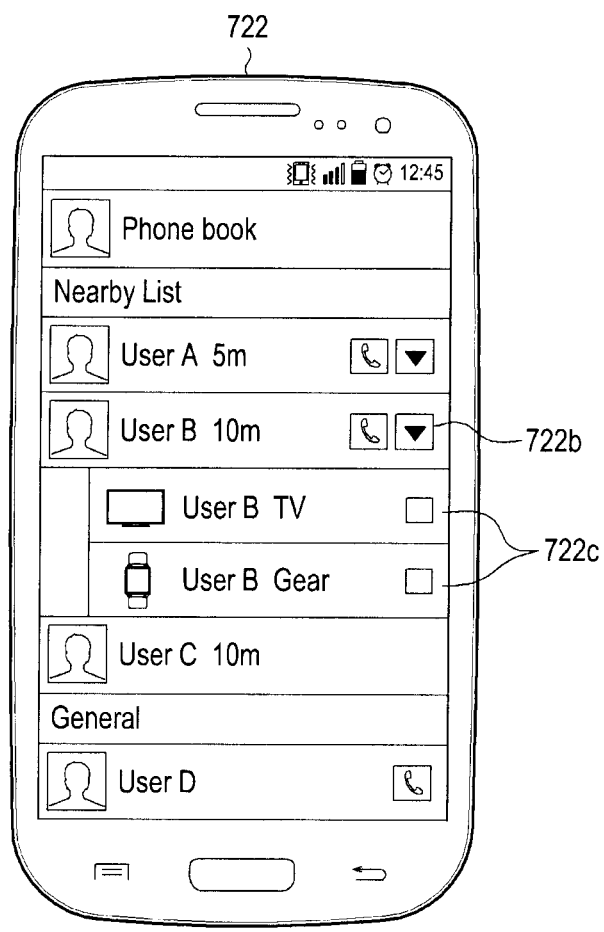
Figure 7E:
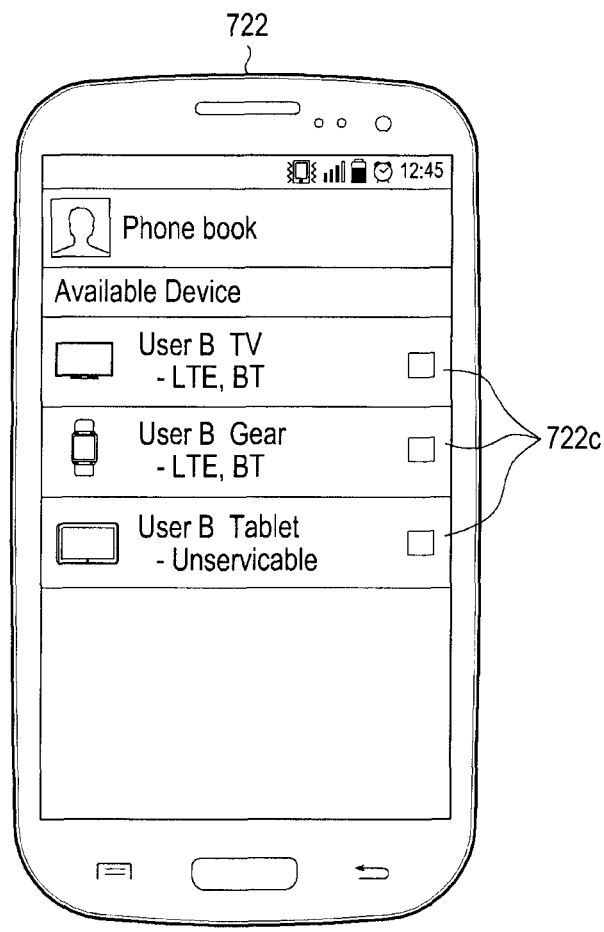

When the first user has selected the user interface 722b, the main electronic device 722 may provide connection information on at least one sub-electronic device 722c located on the short-range network, as shown in FIG. 7D. According to various embodiments of the present disclosure, as shown in FIG. 7E, information on a sub-electronic device (e.g., a user B tablet) which is not located on the short-range network other than the connection information of one or more sub-electronic devices 764 and 766 which are located on the short-range network may be also displayed. The connection information of the sub-electronic devices 764 and 766 may be controlled by the main electronic device 722 to be displayed in a separate window as shown in FIG. 7E.

Figure 7F:
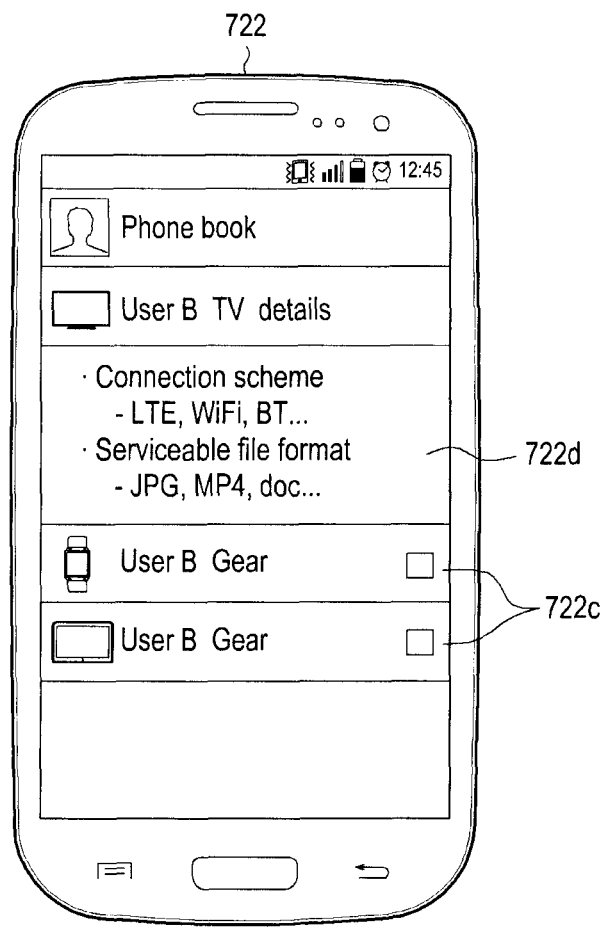

Referring now to FIG. 7F, detailed description for the one or more sub-electronic devices 764 and 766 may be provided. For example, capability information and connectivity information of the sub-electronic devices 764 and 766 may be provided. Further, the main electronic device 722 may display a display order of the sub-electronic devices 764 and 766 according to a predetermined priority to be different from a display order shown in FIG. 7F.

Figure 7G:
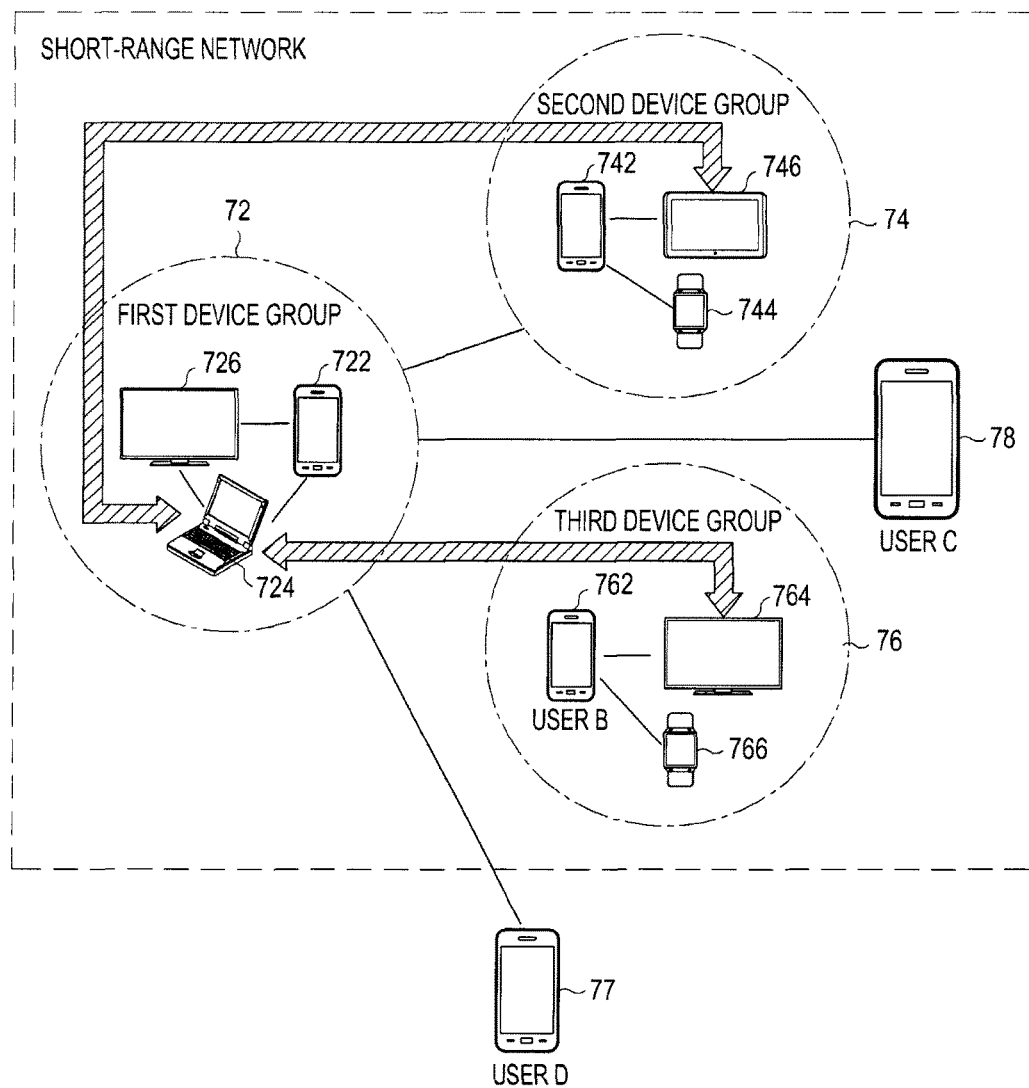

Referring now to FIG. 7G, when a selection input of at least one of the sub-electronic devices 764 and 766 has been received, the main electronic device 722 may configure a session for short-range communication with an electronic device which is selected according to the selection input on the basis of the received connection information. The target data can be transmitted through the configured session.

According to various embodiments, the main electronic device 722 or a sub-electronic device (e.g., a laptop 724) transmitting the target data to the selected electronic device may convert, on the basis of the capability information, the target data in a file format supported by the electronic device to which the target data is transmitted, and then transmit the converted target data. For example, when the target data has been stored in a ppt form in the laptop 724 and the electronic device, to which the target data is transmitted, corresponds to a smart TV 764, the target data which has been stored in the ppt form may be converted (i.e., transcoated) to an image file format such as jpg and then transmitted to the smart TV 764.

Figure 8:
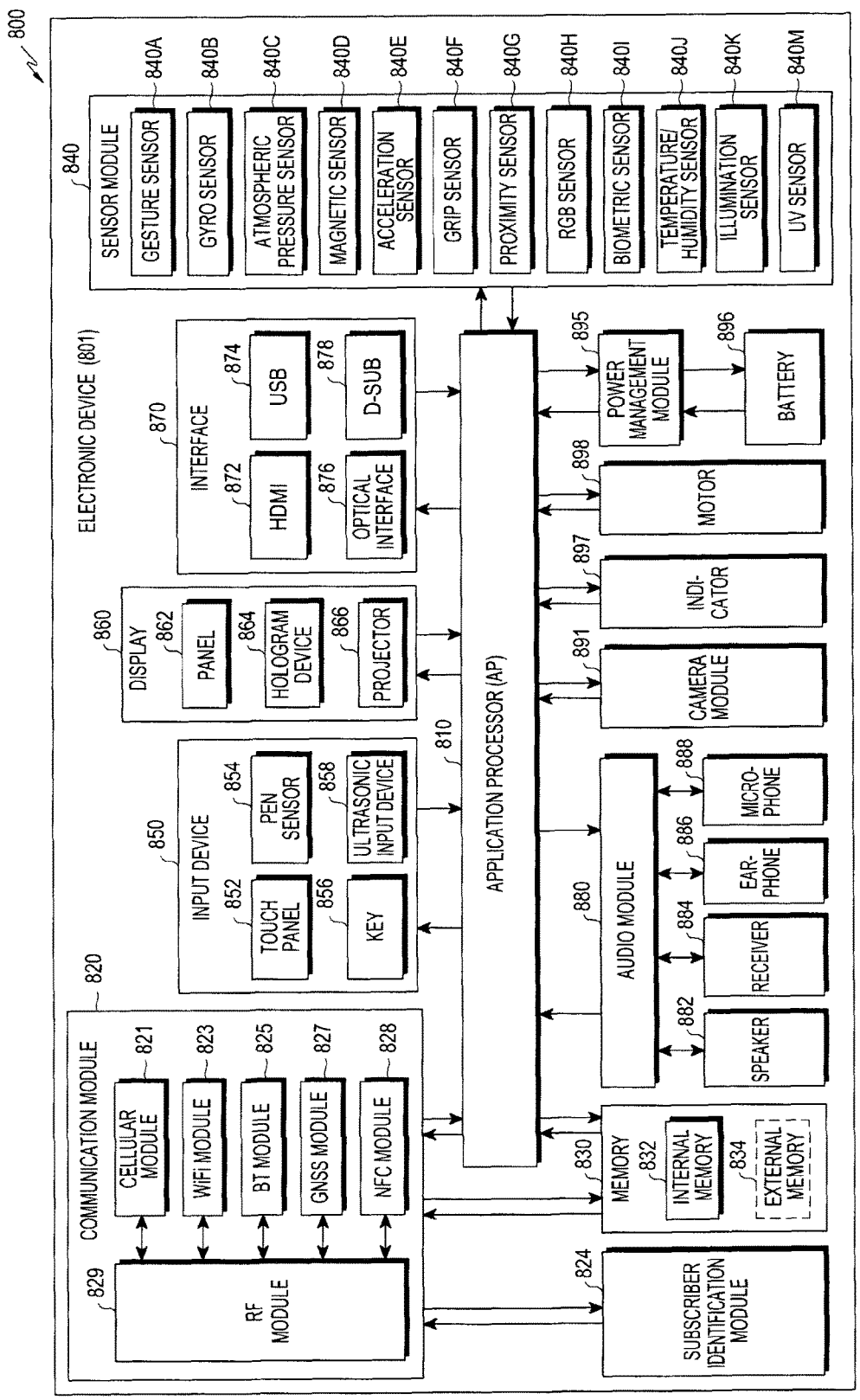
FIG. 8 is a block diagram illustrating an example of an electronic device according to various embodiments of the present disclosure.

FIG. 8 is a block diagram illustrating an electronic device according to various embodiments of the present disclosure.

Referring now to FIG. 8, an electronic device 801 may include, for example, a whole or a part of the electronic device 101 shown in FIG. 1A. The electronic device 801 may include at least one processor (e.g., Application Processor (AP)) 810, a communication module 820, a Subscriber Identification Module (SIM) 824, a memory 830, a sensor module 840, an input device 850, a display 860, an interface 870, an audio module 880, a camera module 891, a power management module 895, a battery 896, an indicator 898, and a motor 898.

The at least one processor 810 may control a plurality of hardware or software elements connected to the processor 810 by driving an operating system or an application program and perform processing of various pieces of data and calculations. The processor 810 may be implemented by, for example, a System on Chip (SoC). According to an embodiment, the processor 810 may further include a Graphic Processing Unit (GPU) and/or an image signal processor, which are integrated circuits configured for operation. The processor 810 may include at least some (for example, a cellular module 821) of the elements illustrated in FIG. 8. The processor 810 may load, into a volatile memory, instructions or data received from at least one (for example, a non-volatile memory) of the other elements and may process the loaded instructions or data, and may store various data in a non-volatile memory.

The communication module 820 may have a configuration equal or similar to that of the communication interface 180 of FIG. 1A and also include hardware such as a transmitter, receiver, transceiver, antenna, antenna array, codec(s), etc. The communication module 820 may include, for example, the cellular module 821, a Wi-Fi module 823, a Bluetooth (BT) module 825, a GNSS module 827 (for example, a GPS module, a Glonass module, a Beidou module, or a Galileo module), an NFC module 828, and a Radio Frequency (RF) module 829.

The cellular module 821 may provide a voice call, an image call, a text message service, or an Internet service through, for example, a communication network. According to an embodiment, the cellular module 821 may identify and authenticate the electronic device 801 within a communication network using a subscriber identification module (for example, the SIM card 824). According to an embodiment, the cellular module 821 may perform at least some of the functions that the processor 810 may provide. According to an embodiment, the cellular module 821 may include a Communication Processor (CP).

The Wi-Fi module 823, the Bluetooth module 825, the GNSS module 827, or the NFC module 828 may include, for example, a processor including hardware configured for operation that processes data transmitted and received through the corresponding module. According to some embodiments, at least some (for example, two or more) of the cellular module 821, the Wi-Fi module 823, the Bluetooth module 825, the GNSS module 827, and the NFC module 828 may be included in one Integrated Chip (IC) or an IC package.

The RF module 829 may transmit/receive, for example, a communication signal (for example, an RF signal). The RF module 829 may include, for example, a transceiver, a Power Amp Module (PAM), a frequency filter, a Low Noise Amplifier (LNA), or an antenna. According to another embodiment of the present disclosure, at least one of the cellular module 821, the Wi-Fi module 823, the Bluetooth module 825, the GNSS module 827, and the NFC module 828 may transmit and receive RF signals through a separate RF module having a transmitter, receiver, transceiver, antenna, etc.

The subscriber identification module (SIM) 824 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The non-transitory memory 830 (for example, the memory 130) may include, for example, an internal memory 832 or an external memory 834. The internal memory 832 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disk drive, a Solid State Drive (SSD), and the like).

The external memory 834 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, or the like. The external memory 834 may be functionally and/or physically connected to the electronic device 801 through various interfaces.

The sensor module 840 may measure a physical quantity or detect an operation state of the electronic device 801, and may convert the measured or detected information into an electrical signal. The sensor module 840 may include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (for example, a red, green, blue (RGB) sensor), a biometric sensor 840I, a temperature/humidity sensor 840J, a light sensor 840K, and a ultraviolet (UV) sensor 840M. Additionally or alternatively, the sensor module 840 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 840 may further include a control circuit for controlling one or more sensors included therein. In some embodiments, the electronic device 801 may further include a processor configured to control the sensor module 840 as a part of or separately from the processor 810, and may control the sensor module 840 while the processor 810 is in a sleep state.

The input device 850 may include, for example, a touch panel 852, a (digital) pen sensor 854, a key 856, and an ultrasonic input unit 858. The touch panel 852 may use at least one of, for example, a capacitive type, a resistive type, an infrared type, and an ultrasonic type. Also, the touch panel 852 may further include a control circuit. The touch panel 852 may further include a tactile layer and provide a tactile reaction to the user.

The (digital) pen sensor 854 may include, for example, a recognition sheet which is a part of the touch panel or is separated from the touch panel. The key 856 may include, for example, a physical button, an optical key or a keypad. The ultrasonic input device 858 may detect ultrasonic waves generated by an input tool through a microphone (for example, a microphone 888) and identify data corresponding to the detected ultrasonic waves.

The display 860 (for example, the display 160) may include a panel 862, a hologram device 864 or a projector 866. The panel 862 may include a configuration identical or similar to that of the display 160 illustrated in FIG. 1A. The panel 862 may be implemented to be, for example, flexible, transparent, or wearable. The panel 862 and the touch panel 852 may be implemented as one module. The hologram 864 may show a three dimensional image in the air by using an interference of light. The projector 866 may display an image by projecting light onto a screen. The screen may be located, for example, inside or outside the electronic device 801. According to an exemplary embodiment, the display 860 may further include a control circuit for controlling the panel 862, the hologram device 864, or the projector 866.

The interface 870 may include, for example, a High-Definition Multimedia Interface (HDMI) 872, a Universal Serial Bus (USB) 874, an optical interface 876, or a D-sub-miniature (D-sub) 878. The interface 870 may be included in, for example, the communication interface 180 illustrated in FIG. 1A. Additionally or alternatively, the interface 870 may include, for example, a Mobile High-definition Link (MHL) interface, a Secure Digital (SD) card/Multi-Media Card (MMC) interface, or an Infrared Data Association (IrDA) standard interface.

The audio module 880 may bilaterally convert, for example, a sound and an electrical signal. At least some elements of the audio module 880 may be included in, for example, the input/output interface 145 illustrated in FIG. 1. The audio module 880 may process sound information which is input or output through, for example, a speaker 882, a receiver 884, earphones 886, the microphone 888, or the like.

The camera module 891 is a device which may photograph a still image and a dynamic image. According to an embodiment, the camera module 891 may include one or more image sensors (for example, a front sensor or a back sensor) such as CMOS or CCD, a lens, an Image Signal Processor (ISP) or a flash (for example, LED or xenon lamp).

The power management module 895 may manage, for example, power of the electronic device 801. According to an embodiment, the power management module 895 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 896, and a voltage, a current, or a temperature during the charging. The battery 896 may include, for example, a rechargeable battery or a solar battery.

The indicator 897 may display a particular state (for example, a booting state, a message state, a charging state, or the like) of the electronic device 801 or a part (for example, the processor 810) of the electronic device 801. The motor 898 may convert an electrical signal into mechanical vibration, and may generate vibration, a haptic effect, or the like. Although not illustrated, the electronic device 801 may include a processing unit (for example, a GPU) for supporting a mobile television (TV). The processing unit for supporting mobile TV may, for example, process media data according to a certain standard such as Digital Multimedia Broadcasting (DMB), Digital Video Broadcasting (DVB), or mediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 9:
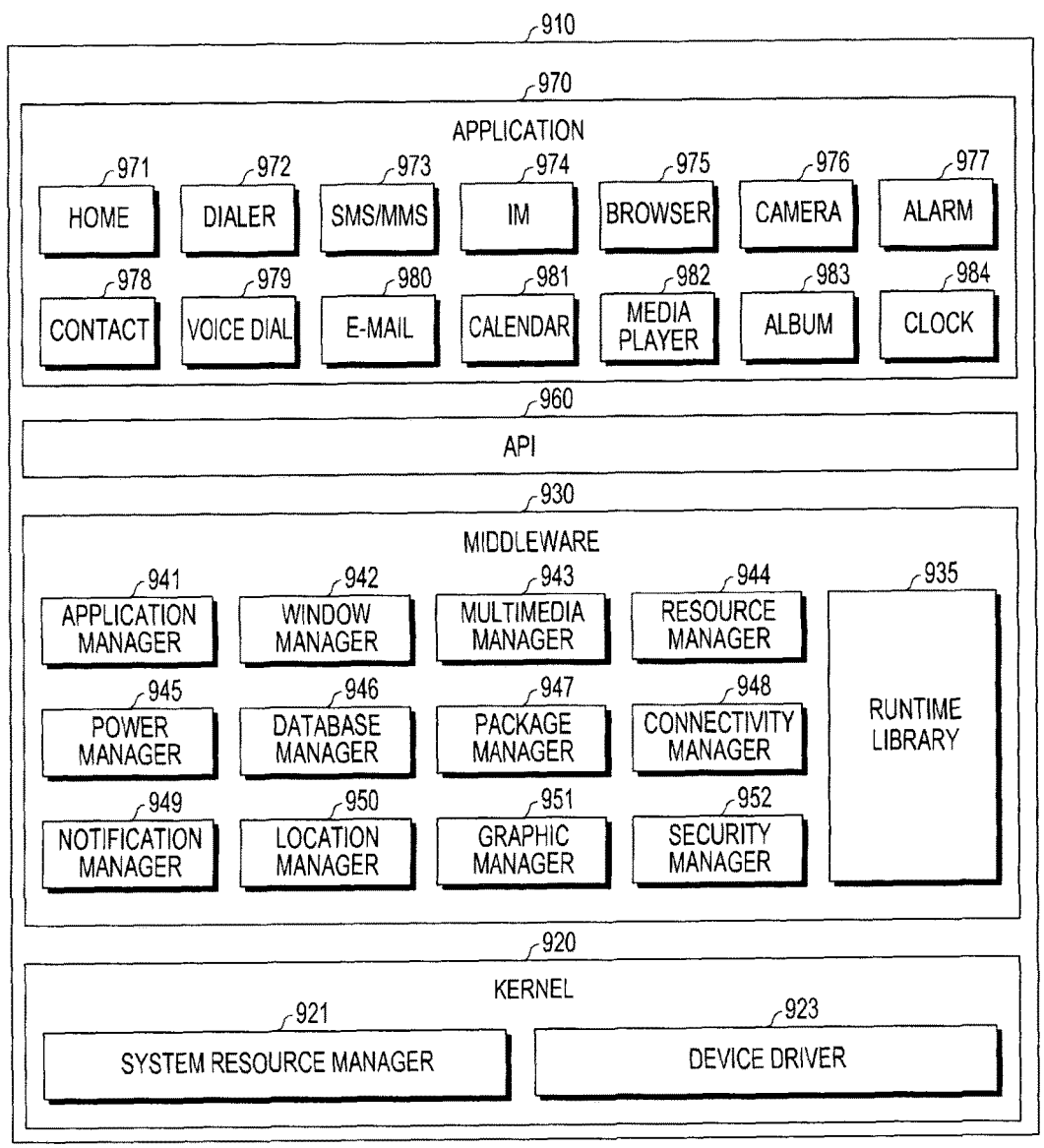
FIG. 9 is a block diagram illustrating an example of a program module according to various embodiments of the present disclosure.

FIG. 9 is a block diagram illustrating an example of a program module according to various embodiments of the present disclosure.

According to an embodiment, a program module 910 (for example, the program 140) may include an Operating System (OS) for controlling resources related to an electronic device (for example, the electronic device 101) and/or various applications (for example, the application programs 147) executed in the operating system. The operating system may be, for example, Android, iOS, Windows, Symbian, Tizen, Bada, or the like.

The program module 910 may include a kernel 920, middleware 930, an Application Programming Interface (API) 960, and/or applications 970. At least some of the program module 910 may be preloaded on the electronic device, or may be downloaded from an external electronic device (for example, the electronic device 102 or 104, or the server 106).

The kernel 920 (for example, the kernel 141) may include, for example, a system resource manager 921 and/or a device driver 923. The system resource manager 921 may perform the control, allocation, retrieval, or the like of system resources. According to an embodiment, the system resource manager 921 may include a process manager, a memory manager, a file system manager, or the like. The device driver 923 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 930 may provide, for example, a function commonly required by the applications 970, or may provide various functions to the applications 970 through the API 960 so that the applications 970 can efficiently use limited system resources within the electronic device. According to an embodiment, the middleware 930 (for example, the middleware 143) may include, for example, at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935 may include a library module which a compiler uses in order to add a new function through a programming language while the applications 970 are being executed. The runtime library 935 may perform input/output management, memory management, the functionality for an arithmetic function, or the like.

The application manager 941 may manage, for example, a life cycle of at least one of the applications 970. The window manager 942 may manage Graphical User Interface (GUI) resources used for the screen. The multimedia manager 943 may determine a format required to reproduce various media files, and may encode or decode a media file by using a coder/decoder (codec) appropriate for the corresponding format. The resource manager 944 may manage resources, such as a source code, a memory, a storage space, and the like of at least one of the applications 970.

The power manager 945 may operate together with a Basic Input/Output System (BIOS) to manage a battery or power, and may provide power information required for the operation of the electronic device. The database manager 946 may generate, search for, and/or change a database to be used by at least one of the applications 970. The package manager 947 may manage the installation or update of an application distributed in the form of a package file.

The connectivity manager 948 may manage a wireless connection such as, for example, Wi-Fi or Bluetooth. The notification manager 949 may display or notify of an event, such as an arrival message, an appointment, a proximity notification, and the like, in such a manner as not to disturb the user. The location manager 950 may manage location information of the electronic device. The graphic manager 951 may manage a graphic effect, which is to be provided to the user, or a user interface related to the graphic effect. The security manager 952 may provide various security functions required for system security, user authentication, and the like. According to an embodiment of the disclosure, when the electronic device (for example, the electronic device 101) has a telephone call function, the middleware 930 may further include a telephony manager for managing a voice call function or a video call function of the electronic device.

The middleware 930 may include a middleware module that forms a combination of various functions of the above-described elements. The middleware 930 may provide a module specialized for each type of OS in order to provide a differentiated function. Also, the middleware 930 may dynamically delete some of the existing elements, or may add new elements.

The API 960 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 970 (for example, the application programs 147) may include, for example, one or more applications which can provide functions such as home 971, dialer 972, SMS/MMS 973, Instant Message (IM) 974, browser 975, camera 976, alarm 977, contacts 978, voice dialer 979, email 980, calendar 981, media player 982, album 983, clock 984, health care (for example, measure exercise quantity or blood sugar), or environment information (for example, atmospheric pressure, humidity, or temperature information).

According to an embodiment, the applications 970 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device (for example, an SMS/MMS application, an e-mail application, a health management application, or an environmental information application). Further, the notification relay application can, for example, receive notification information from the external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment of the disclosure, the applications 970 may include applications (for example, a health care application of a mobile medical appliance or the like) designated according to attributes of the external electronic device 102 or 104. According to an embodiment, the application 970 may include an application received from the external electronic device (for example, the server 106, or the electronic device 102 or 104). According to an embodiment, the application 970 may include a preloaded application or a third party application which can be downloaded from the server. Names of the elements of the program module 910, according to the above-described embodiments of the present disclosure, may change depending on the type of OS.

According to various exemplary embodiments of the present disclosure, at least some of the program module 910 may be implemented in software, firmware, hardware, or a combination of two or more thereof. At least some of the program module 910 may be implemented (e.g., executed) by, for example, the processor (e.g., the processor 210). At least some of the program module 910 may include, for example, a module, a program, a routine, a set of instructions, and/or a process for performing one or more functions.

The term "module" as used herein may, for example, refer to a unit including one of hardware, software and/or firmware in conjunction with hardware or a combination of two or more of them. The "module" may be interchangeably used with, for example, the term "unit", "logic", "logical block", "device", or "circuit". The "module" may be a minimum unit of an integrated device element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as by at least one processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or the programmable hardware include memory devices, e.g., RAM, ROM, Flash, etc., that may store or receive software or computer code that when accessed and executed by the computer, processor or hardware implement the processing methods described herein. The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry, such as integrated circuitry, that is configured for operation. Under the broadest reasonable interpretation, the appended claims constitute statutory subject matter in compliance with 35 U.S.C. § 101 and none of the elements are software per se.

The definition of the terms "unit" or "module" as referred to herein are to be understood as constituting hardware circuitry such as a CCD, CMOS, SoC, AISC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

According to various embodiments of the present disclosure, at least some of the devices (for example, modules or functions thereof) or the method (for example, operations) according to the present disclosure may be implemented by executing in hardware a command stored in a computer-readable storage medium in a programming module form. The instruction, when executed by hardware, such as an integrated circuit (e.g., the processor 120), may cause the one or more processors to execute the function corresponding to the instruction. The computer-readable storage medium may be, for example, the memory 130.

The computer readable recording medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as execute machine codes made by a compiler. The programming module according to the present disclosure may include one or more of the aforementioned devices or may further include other additional devices, or some of the aforementioned devices may be omitted. Operations executed by a module, a programming module, or other device elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and do not limit the scope of the appended claims. Accordingly, the scope of the appended claims should be construed as including all modifications or various other embodiments based on the technical idea of the present disclosure.

What is claimed is:

1. An electronic device comprising:
 a communication module; and
 at least one processor electrically connected to the communication module,
 wherein the at least one processor of the electronic device is configured to:
  receive, on an execution screen of a call application, a first touch input for performing a call with a specified counterpart device via the call application,
  in response to reception of the first touch input, display, on the execution screen of the call application, a message for receiving an user input for transmitting an authentication request to the specified counterpart device,
  receive, on the message, a second touch input for transmitting the authentication request, and
  in response to reception of the second touch input, transmit the authentication request to the specified counterpart device with performing the call,
 wherein the electronic device is included in a first device group, and wherein the specified counterpart device is included in a second device group,
 wherein the first device group and the second device group include at least one sub-electronic device respectively,
 wherein the electronic device is a first main device of the first device group and the specified counterpart device is a second main device of the second device group, and
 wherein the first device group or the second device group is determined according to and at least two of:
  user identification information,
  positions of the first main device, the second main device and the at least one sub-electronic device,
  unique identification numbers of the first main device, the second main device and the at least one sub-electronic device, or
  IP addresses of the first main device, the second main device and the at least one sub-electronic device.

2. The electronic device of claim 1, wherein the electronic device and the at least one sub-electronic device of the first device group are connected through a wireless communication.

3. A method of operating an electronic device, the method comprising:
 receiving, on an execution screen of a call application, a first touch input for performing a call with a specified counterpart device via the call application;
 in response to reception of the first touch input, displaying, on the execution screen of the call application, a message for receiving an user input for transmitting an authentication request to the specified counterpart device;
 receiving, on the message, a second touch input for transmitting the authentication request; and
 in response to reception of the second touch input, transmitting the authentication request to the specified counterpart device with performing the call,
 wherein the electronic device is included in a first device group, and wherein the specified counterpart device is included in a second device group,
 wherein the first device group and the second device group include at least one sub-electronic device respectively,
 wherein the electronic device is a first main device of the first device group and the specified counterpart device is a second main device of the second device group, and
 wherein the method further comprises determining the first device group or the second device group according to at least two of:
  user identification information,
  positions of the first main device, the second main device and the at least one sub-electronic device, unique identification numbers of the first main device, the second main device and the at least one sub-electronic device, or IP addresses of the first main device, the second main device and the at least one sub-electronic device.

4. The method of claim 3, wherein the electronic device and the at least one sub-electronic device of the first device group are connected through wireless communication.

\* \* \* \* \*